(12) United States Patent
Dancer

(10) Patent No.: US 8,093,483 B2
(45) Date of Patent: Jan. 10, 2012

(54) INTERACTIVE WATER FOUNTAIN AND A METHOD OF INTERACTING WITH WATER TO PROVIDE AN AUDITORY OR VISUAL EFFECT

(76) Inventor: Christopher Dancer, Merseyside (GB)

( * ) Notice: Subject to any disclaimer, the term of this patent is extended or adjusted under 35 U.S.C. 154(b) by 1914 days.

(21) Appl. No.: 10/514,576

(22) PCT Filed: May 2, 2003

(86) PCT No.: PCT/GB03/01937
§ 371 (c)(1),
(2), (4) Date: Jun. 13, 2005

(87) PCT Pub. No.: WO03/097255
PCT Pub. Date: Nov. 27, 2003

(65) Prior Publication Data
US 2005/0250588 A1  Nov. 10, 2005

(30) Foreign Application Priority Data

May 16, 2002  (GB) .................................. 0211200.1
Aug. 1, 2002  (GB) .................................. 0217830.9

(51) Int. Cl.
*G10H 1/00* (2006.01)
(52) U.S. Cl. ............. 84/600; 416/20 R; 416/23; 416/33; 84/723
(58) Field of Classification Search ......................... None
See application file for complete search history.

(56) References Cited

U.S. PATENT DOCUMENTS

| | | | |
|---|---|---|---|
| 3,406,941 A | 10/1968 | Ichimori et al. | 251/129 |
| 4,651,777 A | 3/1987 | Hardman | 137/487 |
| 5,730,165 A | 3/1998 | Philipp | 137/1 |
| 5,895,348 A * | 4/1999 | Hosaka | 600/27 |
| 6,206,298 B1 | 3/2001 | Ting | 239/20 |
| 6,505,782 B1 * | 1/2003 | Yen | 239/17 |
| 6,611,114 B1 * | 8/2003 | Yen | 315/360 |
| 7,179,173 B2 * | 2/2007 | Henry et al. | 472/128 |
| 7,427,840 B2 * | 9/2008 | Morgan et al. | 315/295 |
| 7,482,764 B2 * | 1/2009 | Morgan et al. | 315/312 |
| 7,551,161 B2 * | 6/2009 | Mann | 345/156 |
| 2008/0032806 A1 * | 2/2008 | Henry et al. | 472/128 |
| 2009/0223345 A1 * | 9/2009 | Mann | 84/384 |

FOREIGN PATENT DOCUMENTS

| | | |
|---|---|---|
| JP | 62258769 | 11/1987 |
| JP | 63283775 | 11/1988 |

* cited by examiner

*Primary Examiner* — Marlo Fletcher
(74) *Attorney, Agent, or Firm* — Charles N. Quinn, Esq.; Fox Rothschild LLP

(57) ABSTRACT

An interactive water fountain comprising means for providing at least one column or jet (1) of water, means for applying an electrical signal each column or jet (1), detector means (2) for detecting changes in electrical impedance of said water column or jet (1) caused by human interaction therewith and means for activating an electronic device capable of providing an auditory or visual effect upon detection of a change in electrical impedance.

60 Claims, 7 Drawing Sheets

INTERACTIVE WATER FOUNTAIN AND A METHOD OF INTERACTING WITH WATER TO PROVIDE AN AUDITORY OR VISUAL EFFECT

The present invention relates to the field of ornamental water fountains and to a method of interacting with water to provide an auditory or visual effect.

Water fountains have been used for centuries in public places to create a pleasing environment by the presentation of an attractive or unusual visual display, coupled with the sound of moving water. However, fountains are normally passive objects, which do not respond to the presence or actions of people. Some fountain designers have made use of electronic proximity detectors to create fountains which respond to the presence of people by changing their appearance but no fountain is known to exist which responds directly to human touch.

Electronic instruments, or synthesisers, have also been known for many years and many different devices have been employed to allow a player to control them, such as keyboards, drum pads and breath controllers which mimic keyboard instruments, percussion and woodwind instruments respectively. These devices are suitable for use by skilled performance artists. However, it may sometimes be desirable to create a music synthesis installation in a public place, which draws the attention of passers-by and encourages them to participate in creating music. Existing control devices tend to be unsuitable for this purpose because they are visually unimpressive, easily stolen or damaged and require a great deal of practice and dexterity in their use.

Some attempts have been made to allow people to control electronically generated music in a public place. For instance, U.S. Pat. No. 5,589,654 (Konwiser and Konwiser) describes a dance floor that produces sounds in response to movement of people dancing upon it. However, it is not particularly visually appealing and also requires considerable physical energy and agility to achieve reasonably musical results.

The "Laser Harp" invented by B. Szajner (Davies, 1984, "Electronic Instruments", in The New Grove Dictionary of Musical of Musical Instruments, McMillan, 1984) is a musical control device that is visually impressive. However, it suffers from several drawbacks in that it uses optical components, which may be delicate and powerful laser beams, which could pose a health risk to the public. Furthermore, the laser beams that form the "strings" of the harp are invisible in bright, ambient light.

CN2395360U (Xuan) discloses a device containing a row of free-falling water streams which are used to control the electronic generation of musical notes, the streams being arranged in a row like the strings of a harp, and being played by means of the player interrupting the streams with his or her hands. The streams are enclosed by a frame and they fall vertically from an upper member of the frame into a collecting vessel. The player's hand is detected when it interrupts a light beam shining parallel and adjacent to the stream. However, this invention requires that the water streams be enclosed by a frame and that they fall vertically. Accordingly, the device cannot be constructed as a free-flowing fountain. Additionally, careful positioning of the components is necessary to ensure that the water streams and light beams align closely. Furthermore, the device could be susceptible to false triggering caused by wind blowing streams of water across the light beams.

Other inventions have been disclosed in which jets or streams of water are directed to impinge on sound-producing members in order to create music. For example, U.S. Pat. No. 1,912,562 (Zynda) describes a "musical fountain" based on this principle. More recently, inventors have disclosed means of modulating a jet of water with a sound wave so that when it strikes a suitable resonator the sound waves carried by the water jet are made audible; see for example, U.S. Pat. No. 6,095,889 (Demarinis). The type of installation most commonly referred to as a "musical fountain" consists of a decorative water fountain which responds to a musical performance, either pre-recorded or played live, by changes in the force, shape or number of the visible water jets and/or illumination of the jets.

It is an object of the present invention to provide a new type of water fountain that responds to human touch to provide an auditory or visual effect.

A further object of the present invention is to provide a new method of interacting with water to provide an auditory or visual effect.

Accordingly, a first aspect of the present invention provides an interactive water fountain comprising means for providing at least one column or jet of water, means for applying an electrical signal to the column or jet, detector means for detecting changes in electrical impedance of said water column or jet caused by human interaction therewith and means for activating an electronic device capable of providing an auditory or visual effect upon detection of a change in electrical impedance.

A second aspect of the present invention provides a method of interacting with water to provide an auditory or visual effect, the method comprising the steps of providing a contiguous column or jet of water, applying an electrical signal to the column or jet, detecting any change in electrical impedance of said column or jet caused by human interaction therewith and activating an electronic device capable of producing an auditory or visual effect upon detection of a change in electrical impedance.

The method and apparatus of the present invention rely on the detection of changes in electrical impedance of a water jet caused by its interaction with the inherent capacitance of the human body.

The means for providing at least one jet or column of water preferably comprises one or more nozzles having water delivered thereto from a reservoir. The reservoir may be, for example, a swimming or decorative pool. Preferably, the nozzles are arranged to provide a row or fan of jets, for example to emulate the strings of a harp. Preferably, the jets are arranged such that the water falls or drains back into the reservoir, for example by the provision of angled nozzles. Alternatively, the water may be allowed to fall onto a solid surface, such as a pavement, and drain back into a water tank or other reservoir beneath the surface.

The nozzles for providing the jets of water are preferably arranged so that they may be easily reached by a player's hand. Preferably, adjacent jets are spaced sufficiently far apart that a player's hand will not inadvertently touch an adjacent jet when touching an intended jet, but sufficiently close that the player can move his hands from jet to jet quickly.

Each nozzle is preferably constructed such that the water emanating from it does not immediately break up into separate drops but instead forms a contiguous column or jet for a considerable part of its path through the air. Preferably, each contiguous column breaks up into a non-contiguous column before it touches the reservoir into which it falls, another jet or any other object, which may provide a current path to electrical ground. Alternatively, fully contiguous jets of water, which form an unbroken electrical conductor, may be utilised provided that the point at which the jet impinges upon another jet or conductive body is some considerable distance from the highest point of the jet which may be easily reached by a player and with the understanding that this arrangement may result in some degradation of performance of the apparatus. The angle of the jets and length of the contiguous part of the jet is preferably such that a player cannot easily place a hand into a non-contiguous part of the jet when interacting therewith.

The water jets preferably emanate from within a low wall or box-like housing provided with suitable holes for passage of the water. Said wall or housing may form part of a retaining wall of a water pool. Alternatively, the jets may be made to emanate from the floor through suitable holes in the floor surface.

A pump is preferably provided to pump water into the nozzles from the reservoir. Preferably, the water is passed through a filter prior to entering the nozzles to remove any particulate matter from the water.

The electrical signal is preferably an alternating voltage. Various waveforms may be used, for example a square wave or saw-tooth, however it is to be appreciated that a substantially sinusoidal wave is the most preferred option since it reduces the likelihood of generating extraneous RF signals. Furthermore, a sinusoidal waveform improves the sensitivity of the detector to small changes in impedance caused by hand movements, and it allows variations in water conductivity to be compensated for, as detailed below.

An alternating voltage may be generated by any suitable means. In a preferred embodiment of the invention, the alternating voltage is generated using an oscillator circuit that enables a desired amplitude, frequency and or modulation to be selected by the designer of the system.

Changes in the impedance of the water jets are preferably detected using a detector circuit via a sense electrode in electrical contact with the water jets substantially near to the nozzle outlets. The detector circuit may also comprise electrical filters for reducing or eliminating noise signals.

Preferably, each nozzle contains at least one sense electrode comprising an electrically conductive component, which is in electrical contact with water passing through the nozzle. This forms part of the electrical circuit used to detect any interaction with the water jet/column. The sense electrode may be the entire nozzle if it is formed completely of metal or some metal part thereof. Preferably, the sense electrode is electrically isolated from any other electrical conductors, except for the water passing through it and a touch-detection electronic circuit.

Each nozzle is preferably supplied with water, and may be mechanically supported by, a conduit of electrically non-conductive material, such as a plastics material. This may be in the form of a straight pipe, a flexible tube or a block containing an enclosed watertight channel. Preferably, the conduit is a flexible tube. A null electrode is preferably provided in the conduit. Preferably, the null electrode comprises an electrically conductive component provided part of the way along the conduit that is in electrical contact with water passing through the conduit. For example, the null electrode may be in the form of a section of metal tube through which the water passes or a metal grid, wire or vane that is placed across the path of the water. If the null and sense electrodes are made of metal, the electrodes are preferably made from metal of identical composition in order to prevent electrolytic corrosion and the appearance of anomalous voltages that may interfere with the detection means.

Connecting means, such as wires, are provided to connect the sense electrode and the null electrode to a touch-detection electronic circuit, possibly by a plug-and-socket type connector.

The length and width of the conduit between the sense and null electrode is preferably such that, when water is flowing through the conduit at a normal rate, the electrical resistance between these electrodes is greater than or equal to one twentieth of the electrical resistance between the sense electrode and the furthest point of the contiguous part of the jet that may be easily touched by the player.

At least part of the touch-detection electronic circuitry is preferably encased in a central control unit. This casing may also house a power supply and/or battery, a microprocessor, interface circuitry and the means for generating the drive signal imposed on the sense electrode. The control unit may also contain the means for activating the electronic device that provides a visual or auditory effect, for example sound generating circuits and amplifiers. Alternatively, a computer may fulfil any or all of these functions, through suitable interface cards or devices.

Preferably, the touch detection electronic circuit also includes a series of buffer amplifiers, one for each nozzle, and associated control electronics wherein the input of each buffer amplifier is connected to the sense electrode and the output to the null electrode. The buffer amplifier buffers the electrical signal from the sense electrode and nullifies the effect of the resistance between the sense electrode and the null electrode.

A single oscillator may provide the signal for all of the nozzles or alternatively, each nozzle may be connected to its own, independent oscillator. Likewise, each nozzle may be connected to an independent detector circuit or may share a common detector. Where a single oscillator and or detector are employed, each nozzle may be addressed in a serial fashion via a gate system that samples each nozzle independently in rapid succession. Alternatively, the nozzles may be driven and sensed simultaneously by connecting them in parallel to the signal generator and by having a plurality of detector circuits.

A buffer amplifier and its associated control electronics form a single detector circuit. Each detector circuit is preferably mounted in a small enclosure, which forms part of, or is attached to the nozzle. Alternatively, each detector circuit may be housed in one elongated enclosure running alongside a row of nozzles. The enclosures should be sealed or encapsulated to prevent the ingress of water. Where a detector is encapsulated, it may be encapsulated in a low melting-temperature thermoplastics, or a curable thermosetting plastics material.

In a preferred embodiment of the present invention, the electronic device that is activated is a synthesiser for generating musical sounds. It is to be appreciated however, that additional or alternative outputs may be generated including, without being limited to visual effects; such as lights or lasers; or a signal that can be processed, displayed and or recorded by a computer.

Where an output response is a light, the lights may be mounted away from the apparatus or may be located inside the nozzles or reservoir. With such a set-up, it may be possible to receive instantaneous visual feedback when a jet is touched, i.e. the jet becomes illuminated with either white or coloured light.

Further additional or alternative output responses to those listed above include functions such as electrically opening or closing doors, changing the flow rate or shape of the fountain jets themselves—the jets being modulated by means of solenoid valves or altering the appearance of another fountain elsewhere.

The system may be operated alone or in conjunction with another similar system, such that touching a jet of a first system causes a response in one or more of the other systems. By integrating a plurality of fountains, it is envisaged that more complex tunes may be played if the output of each system is musical; or that games may be played against users of other systems if the outputs are visual or cause the nozzles of other peoples systems to move, and/or the flow characteristics to change.

The apparatus of the invention preferably comprises pump that draws water from a reservoir. The pump or associated pipe-work is preferably fitted with a filter, such as a mesh, to prevent particulate matter from entering the apparatus. The outlet of the pump is connected to a manifold to distribute the now pressurised water between one or more nozzles. Preferably, the manifold is a pipe having sealed ends, an inlet aperture and one or more outlet apertures. This arrangement enables a quantity of pressurised water to be stored in the manifold to reduce the effects of variations in the pumping rate and to more evenly distribute the water between the one or more nozzles. The arrangement is also flexible, enabling a desired number of outlet apertures to be let into the manifold to obtain a desired number of "strings" for the "harp".

The pipe connecting the reservoir to the pump is preferably manufactured of an electrically insulative material for example a plastics material, although at least a part of the pipe must be manufactured of a conducting material to provide a ground connection.

Attached to each outlet aperture of the manifold is a nozzle for producing the water jets of the invention. The nozzles may be connected directly to the manifold, although is it preferable, for reasons outlined below, for the nozzles to be connected to the manifold via feeder pipes. Where fitted, the feeder pipes connecting the nozzles to the manifold are preferably wrapped around the manifold such that the nozzles may be arranged in close proximity to the manifold whilst making the apparatus more compact.

Furthermore, the feeder pipes are preferably manufactured of an insulative material such as a plastics material, although a conductive part should be provided near to the manifold to form the null electrode. The diameter of the feeder pipes is preferably greater than the diameter of the emerging water jets in order to minimise turbulence in the pipe and pressure drop at the nozzle. The diameter must however, be sufficiently small to ensure that the electrical impedance of the water in the pipe does not fall below the limit described above.

The manifold and or nozzles of the invention are preferably mounted in such a way that their orientation may be adjusted to produce a desired arrangement of water jets. Such an requirement may be satisfied by retaining the manifold about pivots at either end which are held in a bracket. Accordingly, the manifold may be orientated and the pivots locked to hold it in-situ. A preferred embodiment envisages the manifold being retained via hand-locking bolts in a u-shaped bracket. Additionally or alternatively, the nozzles may be pivotable by similar means. The pivoting axes of the nozzles and manifold are preferably orientated at 90 degrees to each other to enable the jets to be directed through a wider range of angles. In a most preferred embodiment, each nozzle is mounted in a ball and socket type retainer that enables each nozzle to be directed at any desired position.

For a better understanding of the present invention and to show more clearly how it may be carried into effect reference will now be made by way of example only to the accompanying drawings in which.

The accompanying drawings illustrate interactive fountains according to the present invention with different numbers of water jets. However, it is to be appreciated that an interactive fountain system may possess any number of jets. Identical features in the figures are given the same reference number for the sake of simplicity.

Figure 1:
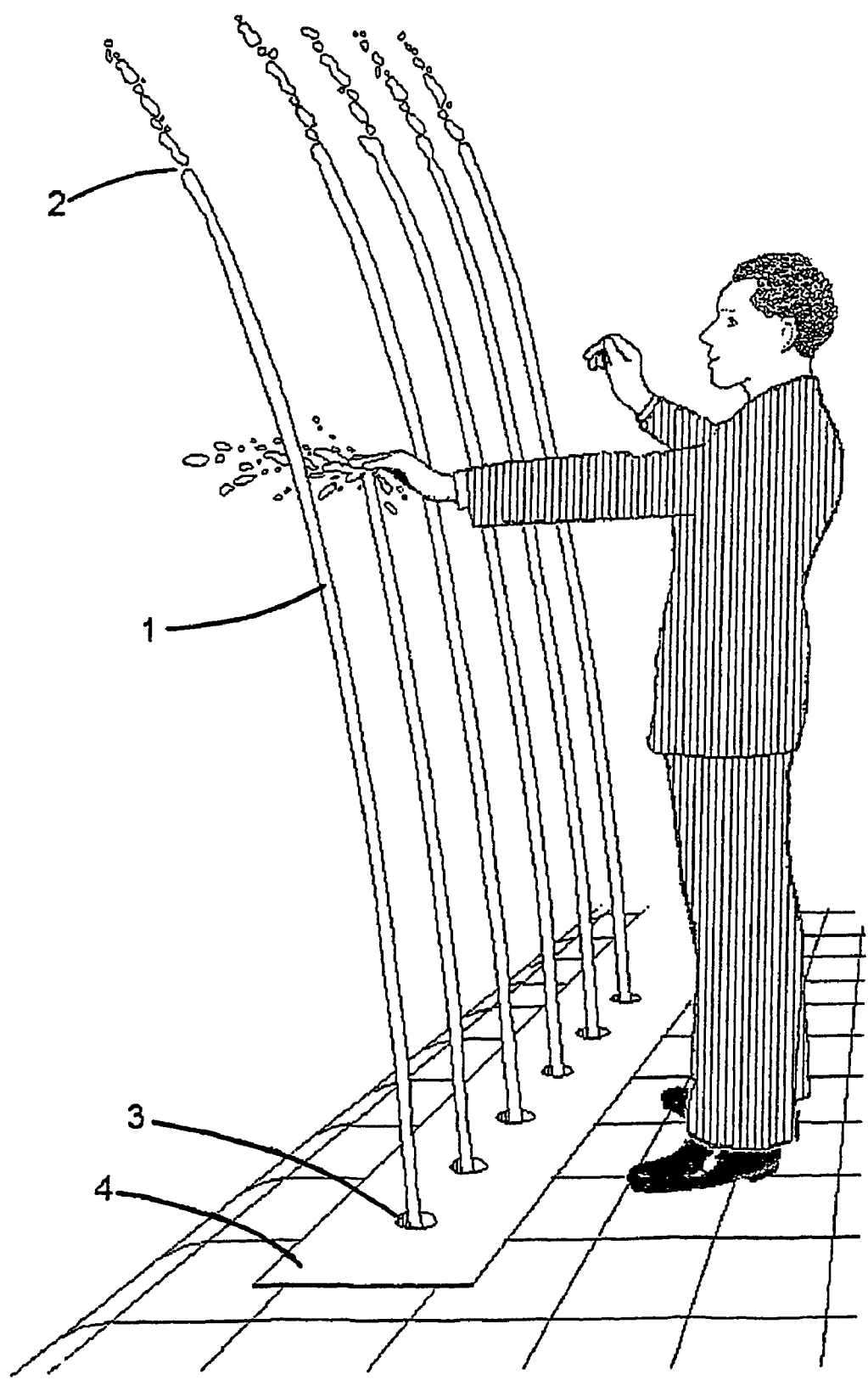
FIG. 1 is a schematic perspective view of an interactive fountain system according to one embodiment of the present invention.

One embodiment of the present invention provides a water fountain system that projects one or more jets of water and has means for the production of musical notes or sounds by an electronic musical synthesiser in response to a player moving his or her hands in or near the jets of water. FIG. 1 of the accompanying drawings illustrates one example of such an interactive fountain system. The system is suitable for use by the side of a swimming pool or other reservoir of water and the components of the system are housed under a plate 4 in the floor. Six water jets 1 project upwardly from holes 3 in the plate 4 and are angled such that the water falls directly back into the pool. Each jet of water breaks up into droplets at a point 2, at a height, which the player cannot easily reach. Below this point the water forms a contiguous column. The jets are spaced sufficiently apart that the player's hand will not inadvertently touch an adjacent jet when touching the intended jet, but sufficiently close that the player can move his hands from jet to jet quickly in order to play melodies.

Figure 2:
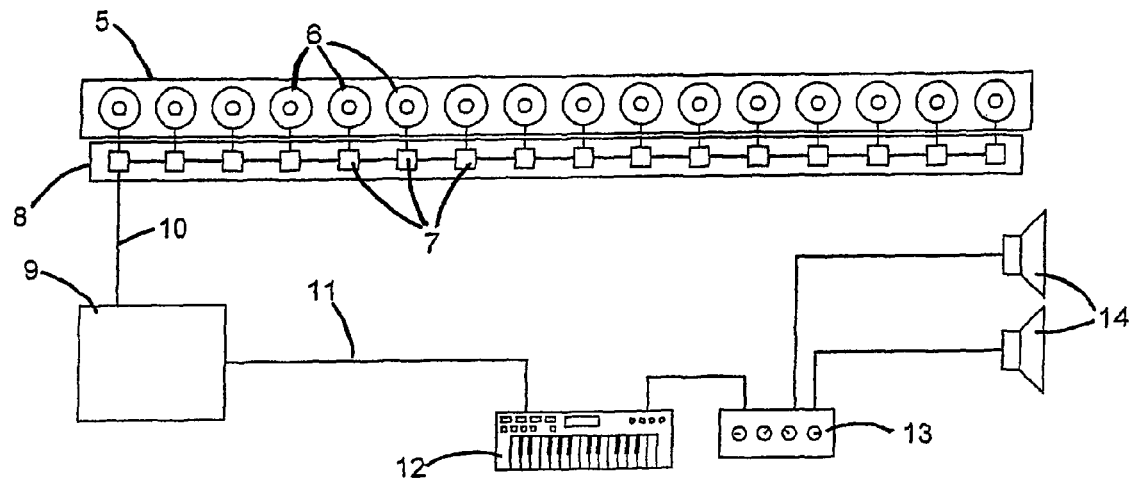
FIG. 2 is a block diagram showing the electronic parts of an interactive fountain system according to another embodiment of the present invention, the system having 16 jet fountains.

FIG. 2 illustrates the electronic components of such an interactive fountain system, this time being provided with sixteen rather than six water jets 1. The system has a nozzle array 5, which holds nozzles 6 for releasing the jets of water and a detector array 8 containing a corresponding number of detector circuits 7. All detector circuits are connected together via a system of power and control lines that are brought out to an interface cable 10 connected to an electronic control unit 9. Output signals from this control unit go to a music synthesiser 12 via a standard Musical Instrument Digital Interface (MIDI) cable 11. Audio signals from the synthesiser 12 are then sent to an audio amplifier 13 and reproduced by loudspeakers 14.

Figure 3:
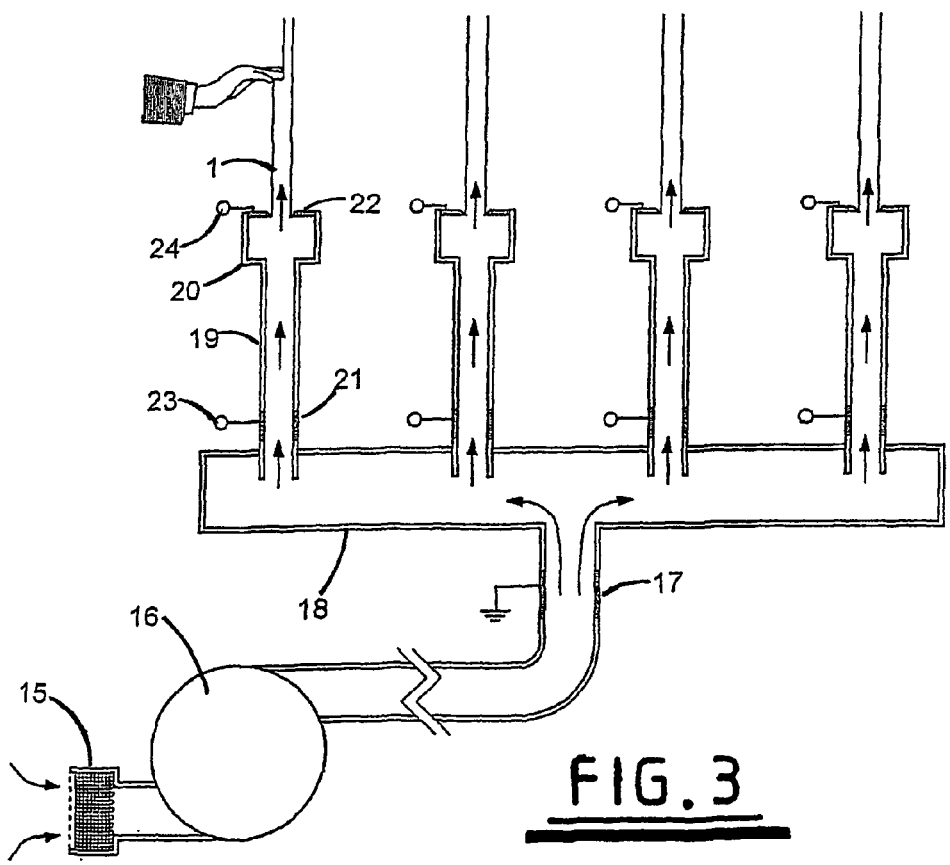
FIG. 3 is a simplified schematic cross-sectional view of the mechanical components of an interactive fountain according to yet another embodiment of the present invention, the system having four jet fountains.

The hydraulic components of the interactive fountain system according to the present invention that has four water jets is illustrated in FIG. 3 of the accompanying drawings. A pump 16 draws in water from a pool (not shown) via a filter 15. The pump sends water to a fountain manifold 18 via a pipe 17, which contains at least one metal section connected to ground, for reasons of electrical safety. The manifold itself is constructed of an electrically insulating material, such as a plastics material. Feeder pipes 19 emerge from the manifold 1 having nozzles 20 attached thereto. Each feeder pipe 19 and nozzle 20 is constructed of an electrically insulating material, except for a section of the feeder pipe near its base, which forms a null electrode 21. A sense electrode is formed from a metal insert 22 across the top of each nozzle. A circular hole in this insert acts as the nozzle orifice from which a water jet emerges. Electrical connections 23, 24 are provided for the null and sense electrodes respectively.

Figure 4:
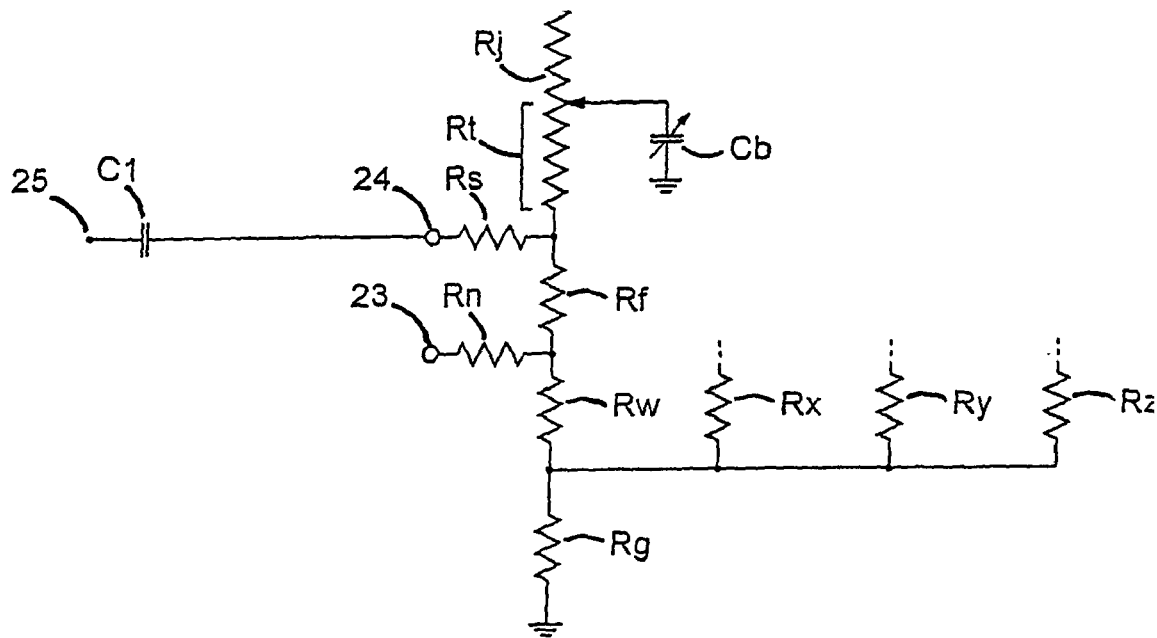
FIG. 4 is an electrical circuit diagram for the fountain system shown in FIG. 3.

The fountain system illustrated in FIG. 3 can be approximated in electrical terms by a network of resistances shown in FIG. 4. The electrical resistance of the contiguous water column 1 emerging from a nozzle is represented by Rj and the resistance of that portion of the jet between the nozzle outlet and the point at which the jet is touched is represented by Rt. Rf represents the resistance of the water in the feeder pipe 19 between the two electrodes 21, 22, Rw the resistance of the water between the manifold 18 and the null electrode 21 and Rg the resistance between the earthed inlet pipe 17 and the manifold 18. Rx, Ry and Rz represent the water resistances between the manifold and null electrodes of the other channels and are analogous to Rw. Details of the other channels are omitted for clarity. The resistances Rs and Rn appear because the sense and null electrodes are not in intimate contact with the whole of the water stream passing through them, but these resistances are very small compared to the other resistances in the diagram.

The variable capacitance Cb represents the capacitance due to the proximity of the hand of the player. The capacitance of the human body results from the body's ability to store electric charge and has a value of approximately 100 pF for a typical person. It should be noted that no direct connection between the body and earth or circuit ground is necessary in order for this capacitance to be detected by the circuit. When the player's hand is held away from the water jet, the value of Cb will be close to zero. When the player makes contact with the jet, Cb will take the value of the player's body capacitance, i.e. approximately 100 pF. If the player's hand is brought close to the water jet but does not touch it, known as the "theremin" mode of playing, the capacitance Cb will consist of the body capacitance in series with capacitance between the jet and hand. Since this latter capacitance is of the order of about 3 pF, the net effect will be a value of Cb slightly less than 3 pF.

The control electronics for an interactive fountain system according to the present invention must be capable of detecting changes in the capacitance Cb as the player approaches or contacts the water jet with his hand and changes of the value of Rt caused by moving the hand up and down the jet. If each nozzle and jet were completely isolated from ground (not shown) then this could be achieved by applying an AC signal at a point 25 through a capacitor C1 to the sense electrode 24. A reactive voltage divider is formed, its upper component being the impedance of C1 ad its lower component being the series impedance of Rs, Rt and the impedance of Cb. Movement of the hand into or close to the water jet causes changes in impedance of the lower component of the voltage divider which in turn causes the signal amplitude seen at the sense electrode 24 to vary. This variation in amplitude can be measured and used to determine whether the jet is being played.

A problem with the above scheme arises form the resistance to ground formed by Rf, Rw and Rg. The water channel feeding the nozzle will usually be both wider and shorter than the water jet emerging from it resulting in the series resistance Rf+Rw+Rg being much less than the resistance Rj of the jet. The effect will be to load the voltage divider so that the changes in signal amplitude at the sense electrode caused by playing are much smaller, making them difficult or impossible to detect reliably. This may be overcome by using much longer and/or much thinner feeder pipes between the manifold and the nozzles. However, a longer pipe would greatly increase the bulk of the fountain system and a thinner pipe would require a faster water flow rate which could lead to turbulence, which in turn would result in some means having to be provided inside the nozzle to remove the turbulence since it is desirable to produce a water jet that is fairly laminar. Both a longer or thinner pipe would require the pump to deliver higher water pressure, creating a need for a more powerful and expensive pump.

Figure 5:
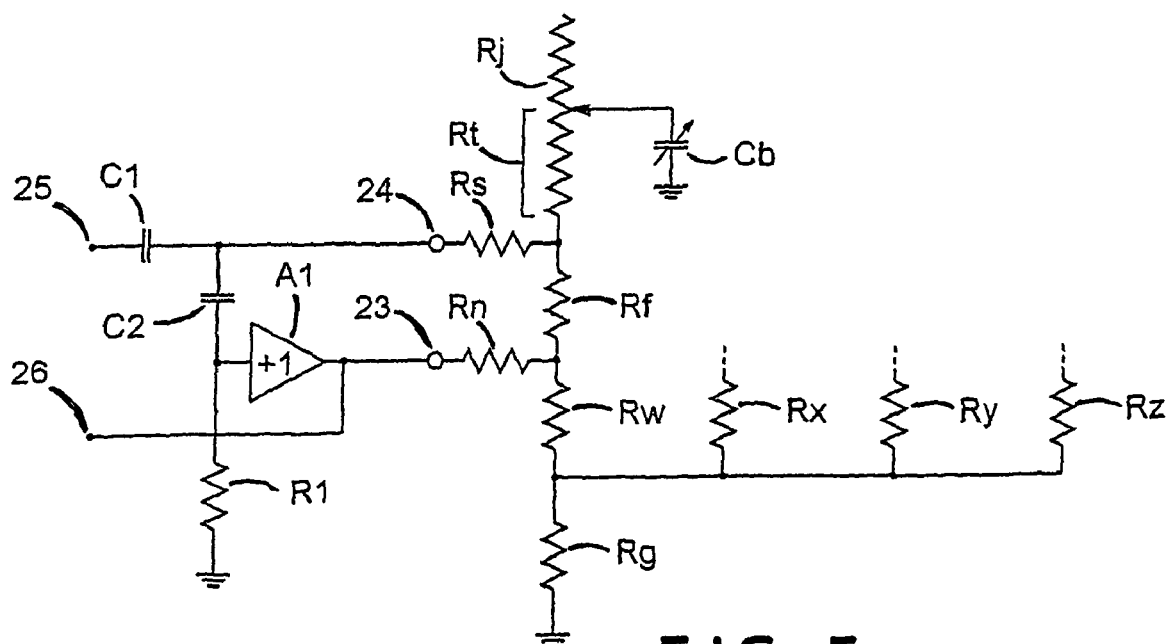
FIG. 5 is an electrical circuit diagram for the fountain system shown in FIG. 3 having a buffer amplifier.

FIG. 5 illustrates a preferred interactive fountain system according to the present invention that addresses the aforementioned problems. A sine wave signal of fixed voltage is delivered through point 25 through input capacitor C1 to the sense electrode 24. A unity-gain amplifier A1 buffers the signal present at the sense electrode. Coupling capacitor C2 acts to remove any DC voltage from this signal and resistor R1 biases the amplifier. The amplifier has a high input impedance and resistor R1 is chosen to have a value of several million ohms in order that the signal at the sense electrode is attenuated as little as possible. The output of the amplifier A1 is fed directly to the null electrode 23. Since the amplifier has a gain of unity, the AC signal applied to the null electrode will be substantially the same as the AC signal present on the sense electrode. This results in the AC current through resistance Rf in the feeder pipe 19 approximating zero. The amplifier circuit therefore acts to eliminate or null-out the low impedance path to ground through Rf. The low-impedance copy of the voltage on the sense electrode created by the amplifier at point 26 is returned to the main control circuit where it is analysed to determine whether the jet is being activated by the player.

One factor that should be taken into account with the present invention is that the conductance of the water supplying the fountain cannot be predicted. The conductance may vary from 200 microsiemens/cm for soft water in an ornamental fountain installation to 4000 microsiemens/cm in a heavily treated swimming pool. The resistance of all the water components in the equivalent circuit will vary inversely with the conductance. The touch-detection unit should therefore be able to function over a potential 20:1 range of water conductance. This may be achieved by using a variable drive oscillator frequency. Since the impedance of the capacitive elements C1 and Cb is inversely proportional to frequency, by selecting a suitable frequency for the drive signal the impedances of the capacitive elements in the circuit may be adjusted so that their relative values are kept the same with respect to the water resistances in the circuit. This may be most easily achieved by using a sine wave oscillator with a frequency that is manually adjustable over a range 20:1 range, for example a range of 10 KHz to 200 KHz is practical. Alternatively, the oscillator's frequency could be controlled automatically, using an electronic circuit to measure the conductivity of the water in the pool or fountain inlet pipe and using the conductivity value so obtained to set the frequency of a voltage-controlled or digitally-controlled oscillator such that it varies proportionally with conductivity. Circuits to measure water conductivity and controllable-frequency oscillator circuits are well known in the art and hence, are not described herein.

The value of the input capacitor C1 should be smaller than the typical body capacitance but higher than the combined input capacitance of the buffer amplifier and stray capacitance of the sense electrode. A value of 12 pF is practical. The buffer amplifier A1 should have an input impedance of greater than 2,000,000 ohms, and as low an input capacitance as possible, be stable at unity gain and exhibit a phase error of less than 0.4 degrees at the highest signal frequency. A FET-input high speed buffer IC may be used, but a more economical alternative is a general-purpose FET-input operational amplifier, used with a compensation network to minimise the phase error at high frequency.

The amplitude chosen for the drive signal, which appears at the sense electrode, is constrained by two factors. If it is too small, then electrical noise from radio transmitters and electrical equipment in the vicinity of the fountain may interfere with the touch detection electronics. If it is too great, then it may cause direct stimulation of nerves in the hands of the player, creating an unpleasant tingling sensation. In practical terms, these limits are around 1 volt to 10 volts respectively. Therefore, the drive voltage should preferably be chosen to lie between these values.

Figure 6:
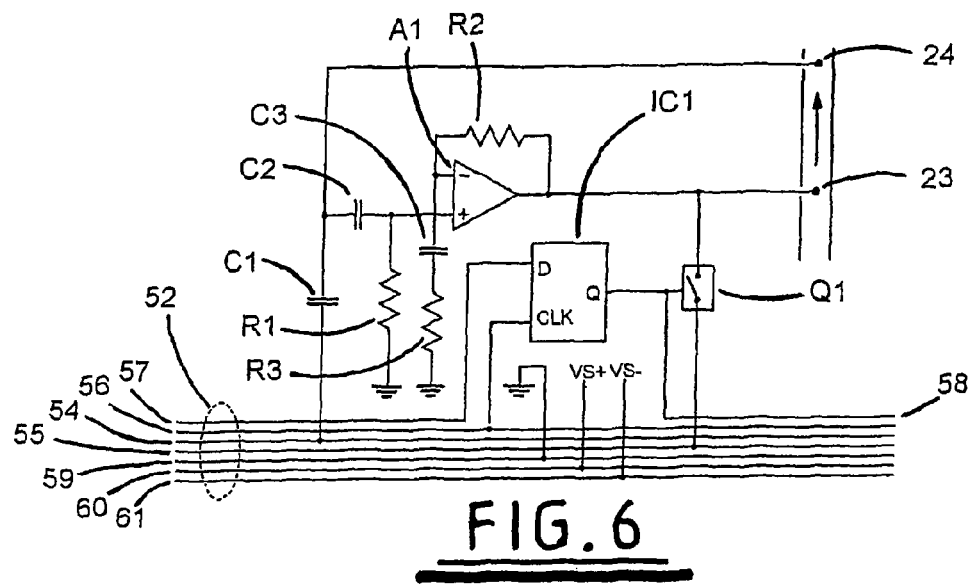
FIG. 6 is an electrical circuit diagram for the detector circuit of a fountain system according to the present invention.

FIG. 6 of the accompanying drawings illustrates a practical circuit diagram for the buffer amplifier and nozzle selection electronics, forming a single detector circuit. Resistor R2 provides negative feedback to limit the gain of amplifier A1 to near unity. The components C3 and R3 provide phase correction when a high drive signal frequency is used. All the detector circuits in the instrument are linked by a bus of seven connectors, shown collectively as 52. This consists of positive, negative and ground power rails 60, 61, 59, a drive signal line 54, a signal return line 55, a clock line 56 and data line 57, 58. The output of the amplifier A1 may be connected to the return signal line 55 by switching on analogue switch Q1. Q1 may be an FET or analogue switch IC. Q1 is switched on by a logic "1" appearing on the output of a D-type latch IC1. Data input line 57 is connected to the D input latch IC1. A logic "1" on this input will be clocked into the latch when the clock line toggles from logic "0" to logic "1". The output of the latch connects to data output line 58, which connects to the data input line of the next detector and so on. The series of latches therefore forms a shift register.

In operation, a logic "1" is temporarily imposed on the data input of the first latch during one transition of the clock line. This "selects" the first detector circuit and the output of its buffer amplifier appears on the signal return line. When the next detector circuit is to be selected the clock line toggles again, the logic "1" is shifted to the second latch, causing the second detector circuit to be selected. The shift process is repeated a number of times equal to the number of nozzles in the fountain, then the entire sequence begins again. Each detector circuit is selected for a period of time long enough to allow the signal analysis electronics in the main control unit to measure the amplitude of the signal on the signal return line. The necessary logic signals for data and clock lines are generated by a microprocessor in the main control unit.

Figure 7:
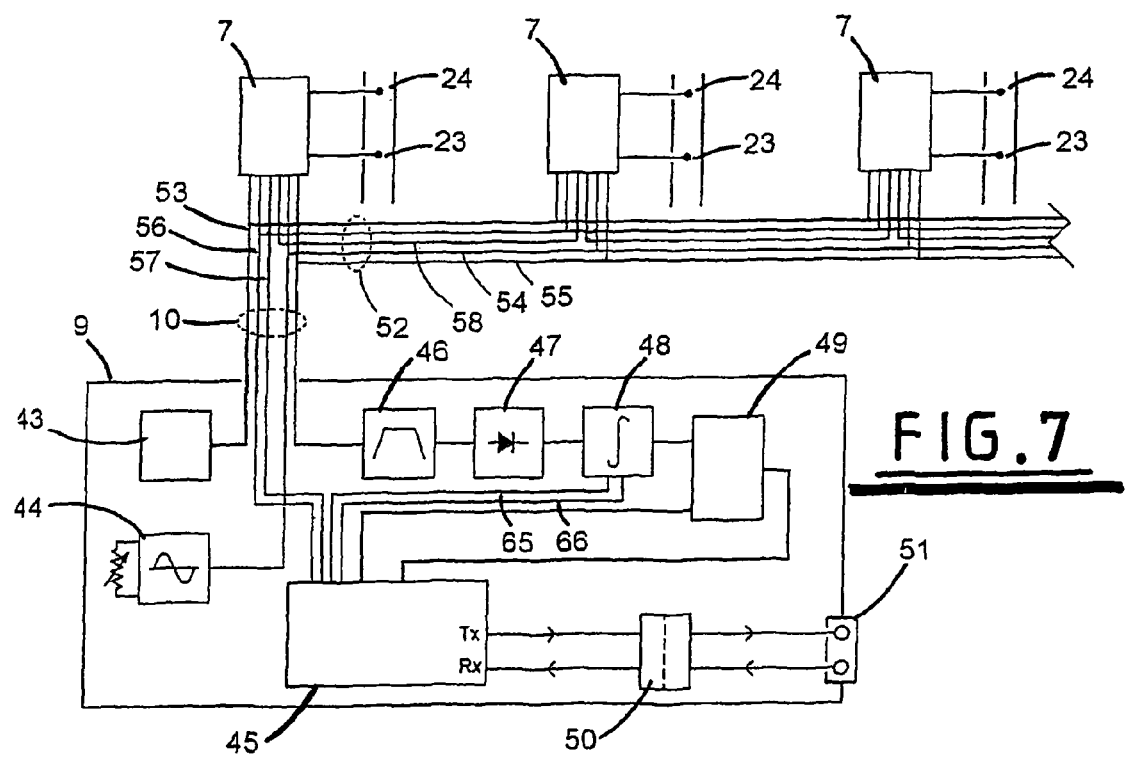
FIG. 7 is a block diagram of the electronic parts of a fountain system according to the present invention.

The electronic parts of an interactive fountain system according to one embodiment of the present invention are shown in block diagram form in FIG. 7 of the accompanying drawings. The detector circuits 7 in the fountain assembly are linked together by the bus 52. The fountain assembly is connected to the control unit 9 by a multi-way interface cable 10. The control unit 9 contains a power supply 43 for providing low voltage power for all the electronics, a variable frequency oscillator 44 for generating the drive signal for the detector circuits, a microprocessor 45 programmed to generate all the control signals and MIDI interface signals, signal analysis circuits 46, 47, 48, 49, an opto-isolator 50 for providing an electrically isolated interface between the control unit, and an external synthesiser via output connector 51. The power supply may make use of batteries, mains electricity or some combination of these. The microprocessor is preferably of the type known as a "microcontroller" which contains RAM for temporary data storage, some form of ROM in which the program is stored, and other components such as a clock oscillator, input/output ports and a UART for serial communication.

A signal from the currently selected detector circuit arrives on the signal return line 55 and is filtered by band-pass filter 46 to remove radio-frequency interference and low-frequency signals emanating from electrical mains wiring. The filtered signal is rectified by rectifier 47 then integrated by integrator 48. The integrator output voltage is then converted to a digital value by an analogue to digital converter 49, the output of which is read by the microprocessor 45.

Figure 8:
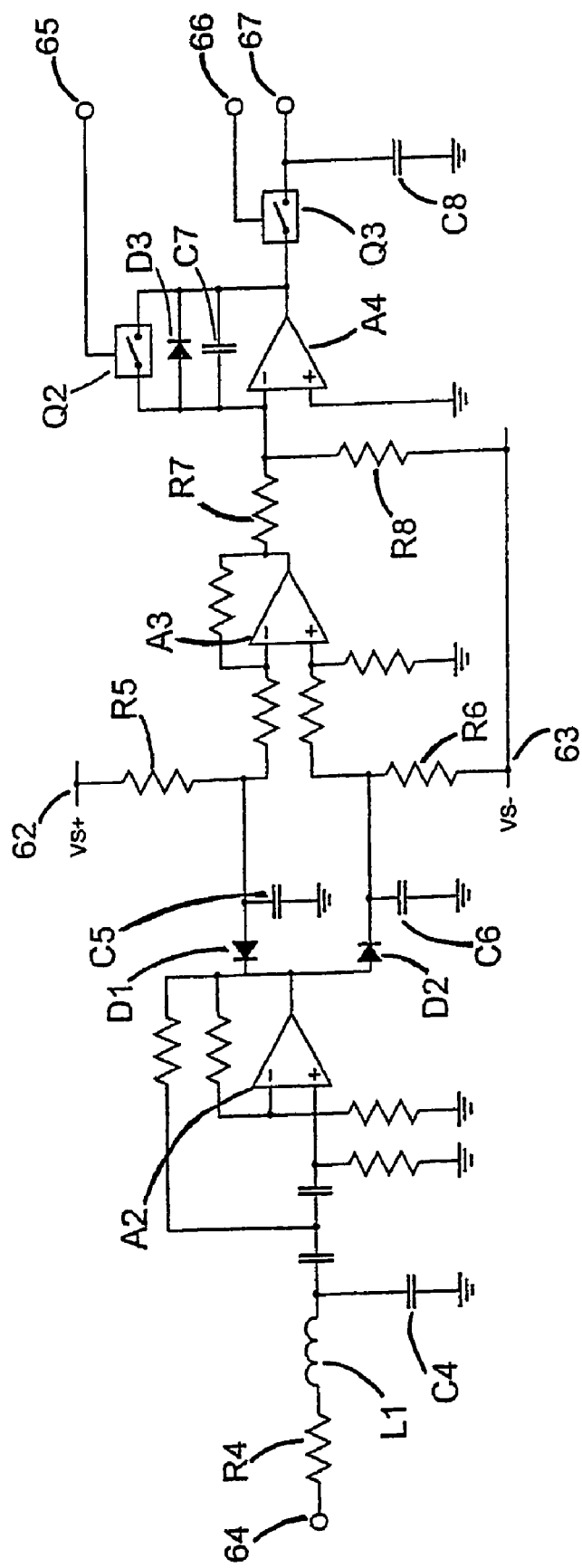
FIG. 8 is a schematic electrical circuit diagram of a signal detection circuit of a fountain system according to the present invention.

FIG. 8 illustrates a signal processing circuit for a fountain assembly of the present invention. A signal on input 64 is first low-pass filtered by components R4, C4 and L1, then high-pass filtered by op-amp A2 and its associated components. The resulting signal is fed to two diode detectors formed by D1, C5 and R5, and D2, C6 and R6. These form positive and negative peak detection. The voltages on C5 and C6 are fed to a differential amplifier formed by op-amp A3 and associated components.

The DC component of the voltage at the output A3 varies according to the position of the player's hand in or near the water jet, being about −1.2 volts when the jet is touched close to the nozzle, becoming more positive as the hand is moved up the jet, more positive still if the hand is merely held close the jet and yet more positive if no part of the player's body is near the jet. This voltage is fed to an integrator formed by op-amp A4 and associated components. Resistor R7 converts the voltage at A3 output into a current to charge integrator capacitor C7. Resistor R8 biases the integrator such that its output always ramps in a positive direction over the full range of input signal amplitude. Diode D3 limits negative excursions on A4's output. Analogue switch Q2 is used to discharge C7 in order to reset the integrator before a new signal measurement is performed. Analogue switch Q3 and capacitor C8 form a sample-and-hold circuit used to sample the integrator output voltage at the end of the measurement period. The voltage on V8 is taken via an output to the input of the ADC. Q2 and Q3 may be FETs or analogue switch ICs.

In operation, the first detector circuit is selected, using the method described above. Integrator 48 is reset by taking control line 65 to a logic "1" momentarily. The signal measurement period then begins, in which the integrator output ramps up at a rate dependent on the signal amplitude. At the end of this period, which typically will be several milliseconds, the integrator voltage is sampled by taking control line 66 to logic "1", which turns on Q3 causing C8 to charge to the integrator voltage. Q3 is then turned off by taking line 66 to logic "0" and the ADC is instructed to take a measurement of the voltage on C8. The output value produced by the ADC is read and stored in the microprocessor and is used by the internal program to determine the present playing status of the first water jet. The second detector circuit is then selected, and the process repeats, until all detector circuits have been interrogated. The microprocessor then collates the status information it has obtained from all the jets, makes decisions about what information it must send to the synthesiser about the notes currently being played, formats this information into a form the synthesiser can interpret and transmits it through the MIDI port.

Figure 9:
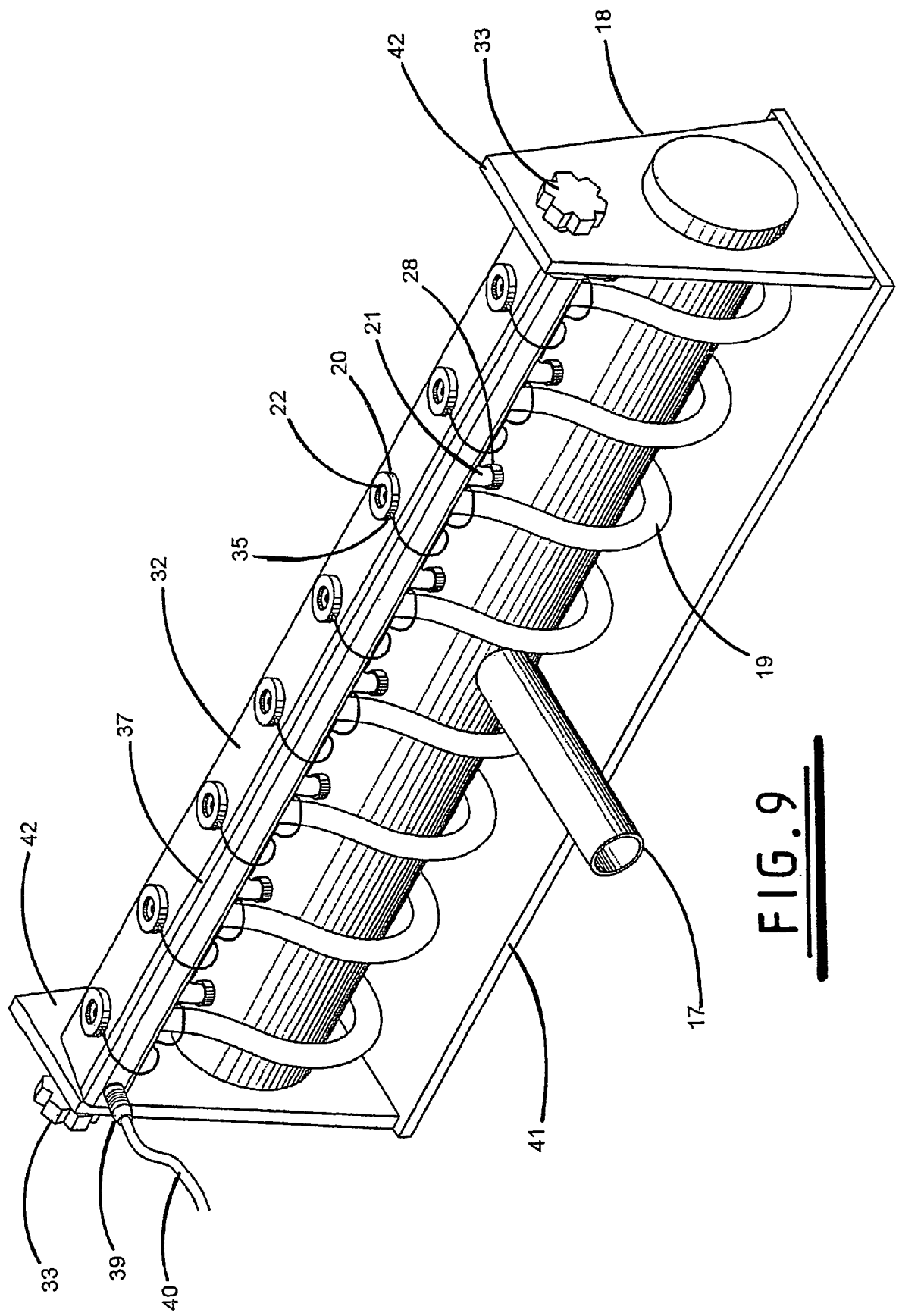
FIG. 9 is a perspective view of a fountain assembly for an eight-jet fountain system according to an embodiment of the present invention.
Figure 10:
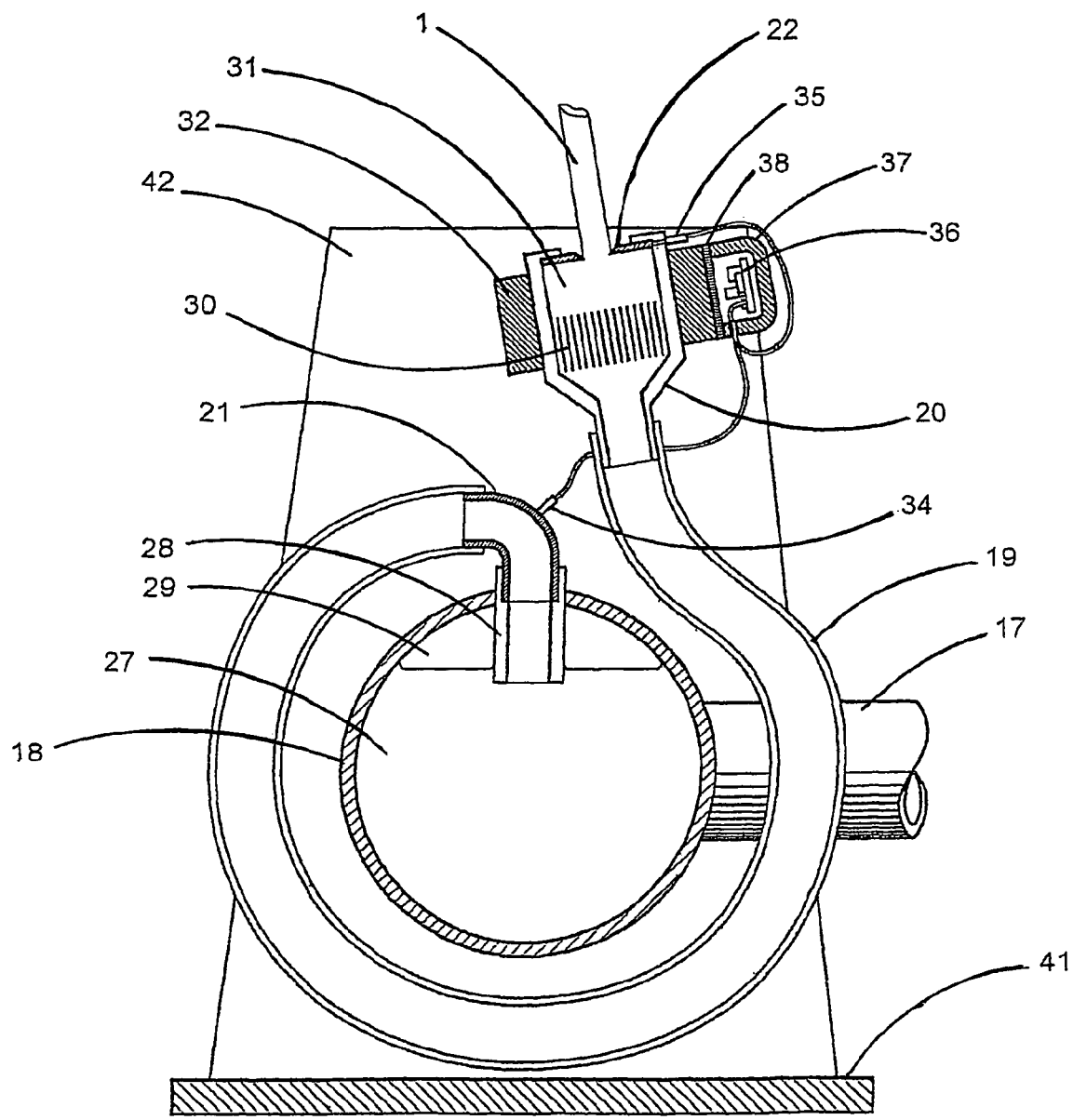
FIG. 10 is a cross-sectional view of the fountain assembly shown in FIG. 9.

The mechanical components of an interactive fountain system according to a preferred embodiment of the present invention are illustrated in FIGS. 9 and 10. The nozzles 20 for the water jets 1 are held in a mounting block 32. The mounting block is held in a frame consisting of a base 41 and end plates

42. The mounting block may be rotated about its long axis in order to adjust the angle of the emerging fountain jets, and may be locked in a desired position by hand-wheel bolts 33. On one side of the mounting block is attached an enclosure 37 containing the nozzle amplifier assemblies 36. The enclosure is waterproofed by a gasket 38. The amplifier circuits 36 are connected to the electrodes 21, 22 by wires and waterproof single-pole connectors 34, 35. Connection is made to the control electronics unit by means of a multi-pole waterproof connector 39 and interface cable 40.

The frame supporting the mounting block also holds the manifold 18 in place. Water enters the manifold through pipe 17. In operation, the manifold will be largely filled with water, except for an air space 29. The air space is not an essential component of the design but it may act to damp out rapid variations in water pressure within the manifold caused by the pump and therefore lead to less turbulent water flow through the nozzle channels. The manifold outlet pipes 28 lead to the null electrodes 21 which are made in the form of metal pipes with a 90° angle. The outer surface of the null electrodes may be coated in some suitable material to act as an electrical insulator. The null electrodes are connected to the nozzles 20 by feeder pipes 19. These are made of a flexible plastics material and make one turn around the manifold before entering the nozzles. This arrangement of the feeder pipes ensures a long water path, and hence a high resistance, between each pair of electrodes whilst keeping the fountain assembly reasonably compact.

Water entering the nozzle passes through a turbulence-reducer 30, which may take the form of a grille, mesh or series of longitudinal vanes. This is intended to break up any large eddies or vortices in the water entering the nozzle so that water flowing through the space immediately below the sense electrode is non-turbulent. The sense electrode 22 is constructed in the form of a metal disc with a circular central orifice. The edge of the orifice is bevelled in order to reduce the area of contact between it and the emerging water jet 1 so that turbulence in the water jet is kept to a minimum. These and other means of reducing turbulence in a projected jet are well known in the art and therefore are not described in detail herein.

The microcontroller (the processor) in the main control unit contains program code stored in non-volatile memory. The program runs continuously when the device is switched on and causes the microcontroller to perform the following functions. The processor repeatedly scans the array of detector circuits in the fountain as described above and for each one it reads its ADC value, which it stores in its internal memory. The ADC value will be small when no-one is close to the jet, will increase as a hand is brought closer to the jet and will suddenly increase to a higher value when a hand contacts the water jet; the actual value depending upon the position of the player's hand along the jet. For each detector the program keeps a record of the range of ADC values, which have been read during the previous several minutes. From the lower values in this range it calculates the baseline ADC value, which is the mean ADC value when this particular jet is not being played. The baseline value may drift with time due to changes in water conductance or temperature, but this drift will happen slowly so it can be compensated for by recalculating the baseline value periodically.

First and second detection threshold values are set in the program. The first detection threshold is set such that when a hand is brought into close proximity to the water jet, the ADC will exceed the threshold. The second detection threshold is set such that the ADC value will only exceed it when a hand actually contacts the water jet. When the ADC value exceeds one or both of the thresholds the processor sends control codes through the MIDI interface to the synthesiser to begin sounding the appropriate note, using the appropriate sound voice or effect. When the player's hand is removed, the ADC value drops below the first threshold and the processor sends the command to turn off the note. In addition, when a note is being played the processor may monitor variations in ADC value caused by movements of the player's hand and translate these into control codes which it then sends to the synthesiser in order to vary some of the characteristics of the musical sound, such as pitch, amplitude or timbre.

It is to be appreciated that the sensor and detection units linked to the control means are not limited to the control of musical sounds but may be applied to the control of any function which is capable of being controlled by an electronic circuit, such as electric lighting (mounted either within or remote from the fountain assembly), electrically operated doors or other mechanisms, or even the flow rate or shape of the water jets themselves, which may be modulated by means of solenoid valves.

The invention claimed is:

1. An interactive water fountain comprising:
   a) means for providing at least one constantly flowing and contiguous column or jet of water,
   b) means for applying an electrical signal each column or jet,
   c) detector means for detecting changes in electrical impedance of said contiguous water column or jet caused by direct physical human interaction therewith;
   d) and means for activating an electronic device capable of providing an auditory or visual effect upon detection of a change in electrical impedance; wherein electrical contact between the human and the water jet causes a change in the electrical impedance of the water jet and wherein this change in electrical impedance is detected by the detector means.

2. A fountain as claimed in claim 1, wherein the means for providing a column or jet of water comprises a nozzle and means for delivering water thereto from a reservoir.

3. A fountain as claimed in claim 2, wherein the nozzles are arranged to provide a row or fan of jets.

4. A fountain as claimed in claim 3, wherein the jets are arranged such that the water falls or drains back into the reservoir.

5. A fountain as claimed in claim 3, wherein the water from the jets is allowed to fall onto a surface for draining back into the reservoir.

6. A fountain as claimed in any one of claim 5 wherein each nozzle is constructed such that the water jet emanating therefrom forms a contiguous column or jet for a part of its trajectory through the air.

7. A fountain as claimed in claim 6 wherein each contiguous column breaks up into a non-contiguous column before it reaches the reservoir, another jet or any other object, which may provide a current path to electrical ground.

8. A fountain as claimed in claim 5 wherein the jets are fully contiguous and form an unbroken electrical conductor, provided that the point at which the jet impinges upon another jet or conductive body is a cannot be easily reached by a player.

9. A fountain as claimed in claim 7 wherein the angle of the jets and length of the contiguous part of the jet is such that a player cannot easily place a hand into a non-contiguous part of the jet when interacting therewith.

10. A fountain as claimed in claim 9, wherein adjacent jets are spaced sufficiently far apart that a player's hand will not inadvertently touch an adjacent jet when touching an intended jet, but sufficiently close that the player can move his hands quickly from jet to jet.

11. A fountain as claimed in claim 10 wherein the water jets emanate from within a low wall or box-like housing provided with suitable holes for passage of the water.

12. A fountain as claimed in claim 11, wherein the wall or housing forms part of a retaining wall of a water pool.

13. A fountain as claimed in claim 10 wherein the jets emanate from the floor through suitable holes in the floor surface.

14. A fountain as claimed in any claim 13, wherein the electrical signal which is applied to the water jet is an alternating voltage.

15. A fountain as claimed in claim 14, wherein the waveform of the signal is substantially sinusoidal.

16. A fountain as claimed in claim 15, wherein the alternating voltage is generated using an oscillator circuit that enables a desired amplitude, frequency and or modulation to be selected.

17. A fountain as claimed in claim 16, wherein changes in the impedance of the water jets are detected using a detector circuit, the detector circuit being arranged to sense the water jets using an electrode in electrical contact with the water jets substantially near to the nozzle outlets.

18. A fountain as claimed in claim 17, wherein the detector circuit further comprises electrical filters for reducing or eliminating noise signals.

19. A fountain as claimed in claim 18, wherein each nozzle is supplied with water through a conduit of electrically non-conductive material.

20. A fountain as claimed in claim 19 further comprising a null electrode.

21. A fountain as claimed in claim 20, wherein the null electrode comprises an electrically conductive component provided part of the way along the conduit that is in electrical contact with water passing through the conduit.

22. A fountain as claimed in claim 21, wherein plug-and-socket type connectors are provided for connecting the sense electrode and the null electrode to a touch-detection circuit.

23. A fountain as claimed in claim 22 wherein at least part of the touch-detection electronic circuitry is housed in a central control unit.

24. A fountain as claimed in claim 23, wherein the central control unit houses a power supply, a microprocessor, interface circuitry and the means for generating the drive signal imposed on the sense electrode.

25. A fountain as claimed in claim 24, wherein the power supply is a battery.

26. A fountain as claimed in claim 23, wherein the control unit contains means for activating the electronic device that provides a visual or auditory effect.

27. A fountain as claimed in claim 26, wherein a computer fulfils any or all of the functions of; generating signals, signal detection and or generating auditory or visual effect; via suitable interface cards or devices.

28. A fountain as claimed in claim 27 wherein the touch detection electronic circuit also includes a buffer amplifier for each nozzle.

29. A fountain as claimed in claim 28, wherein the input of the buffer amplifier is connected to the sense electrode and the output of the buffer amplifier is connected to the null electrode.

30. A fountain as claimed in claim 29, wherein the buffer amplifier applies substantially the same voltage to the null electrode as is present at the sense electrode for nullifying the effect of the electrically conductive path to ground which is formed by the water between the nozzle and any electrically grounded apparatus through which water flows because it reaches the nozzle.

31. A fountain as claimed in claim 30, wherein a single oscillator supplies the signal for all nozzles.

32. A fountain as claimed in claim 30, wherein each nozzle is connected to its own, independent oscillator.

33. A fountain as claimed in claim 30 wherein each nozzle is connected to an independent detector circuit.

34. A fountain as claimed in claim 30 wherein the nozzles share a common detector.

35. A fountain as claimed in claim 34, wherein each nozzle is addressed in a serial fashion via a gate system that samples each nozzle independently in rapid succession.

36. A fountain as claimed in claim 31, wherein the nozzles are driven and sensed simultaneously by connecting them in parallel to the signal generator and by having a plurality of detector circuits.

37. A fountain as claimed in claim 30, wherein each buffer amplifier and associated control electronics form a single detector circuit; each detector circuit being mounted in a small enclosure, which forms part of, or is attached to the nozzle.

38. A fountain as claimed in claim 37 wherein the auditory effect activated is a synthesiser for generating sounds.

39. A fountain as claimed in claim 37 wherein the visual effect activated is a light.

40. A fountain as claimed in claim 37, wherein the visual effect activated is a laser.

41. A fountain as claimed in claim 37 wherein the effect activated is a signal that can be processed, displayed and or recorded by a computer.

42. A fountain as claimed in claim 39, wherein the light is mounted away from the apparatus to produce an effect spaced away from the fountain.

43. A fountain as claimed in claims 39, wherein a light is located inside the reservoir.

44. A fountain as claimed in claims 39, wherein a light is located inside a nozzle.

45. A fountain as claimed in claim 39, wherein the operator experiences visual feedback when a jet is touched.

46. A fountain as claimed in claim 45, wherein the feedback is in the form of a jet becoming illuminated when it is touched.

47. A fountain as claimed in claim 37, wherein the effect activated is means for operating valves.

48. A fountain as claimed in claim 47, wherein operation of a valve causes a change in the flow rate or shape of the water jets.

49. A fountain as claimed in claim 47, comprising a valve for changing the flow rate or shape of the water jets of another fountain located away from the fountain being operated.

50. A fountain as claimed in claim 49 arranged to communicate with like fountain, whereby touching a jet of the first fountain causes a response in one or more of the other fountain or fountains.

51. A fountain as claimed in claim 50, wherein a plurality of fountains are integrated in such a way that complex tunes may be played.

52. A fountain as claimed in claim 50, wherein a plurality of fountains are integrated for games to be played between operators of the fountains.

53. A fountain as claimed in claim 52, wherein the outlet of the pumping means is connected to a manifold to distribute the now pressurised water between one or more nozzles.

54. A fountain as claimed in claim 53, wherein the manifold is an elongated vessel having sealed ends, an inlet aperture and one or more outlet apertures.

55. A fountain as claimed in claim 54, wherein each outlet aperture of the manifold is connected to a nozzle for producing the water jets of the fountain.

56. A fountain as claimed in claim 55, wherein the nozzles are connected to the manifold via feeder pipes.

57. A fountain as claimed in claims 56, wherein the feeder pipes are manufactured of an insulative material such as a plastics material with a conductive part provided near to the manifold to form the null electrode.

58. A fountain as claimed in claim 57, wherein the manifold and or nozzles of the invention are mounted in such a way that their orientation may be adjusted to produce a desired arrangement of water jets.

59. A fountain as claimed in claim 58, wherein each nozzle is mounted in a ball and socket type retainer that enables each nozzle to be directed to any desired position.

60. An interactive water fountain comprising:
a) means for providing a continuously flowing column of water;
b) means for applying an electrical signal to the water forming the column;
c) means for detecting a first change in electrical impedance of the water forming the column resulting from a human body part coming into proximity with the water forming the column and detecting a second change in electrical impedance of the water forming the column resulting from the human body part contacting the water forming the column; and
d) means for activating an electronic device providing different audible or visible effects responsively to a signal from said detection means corresponding to detection of said first or second change in electrical impedance of the water forming the column.

\* \* \* \* \*